Nov. 3, 1970 J. A. KROSBY 3,537,764
BEARING FOR THE ROTOR IN AN ELECTRIC MOTOR
Filed Feb. 18, 1969
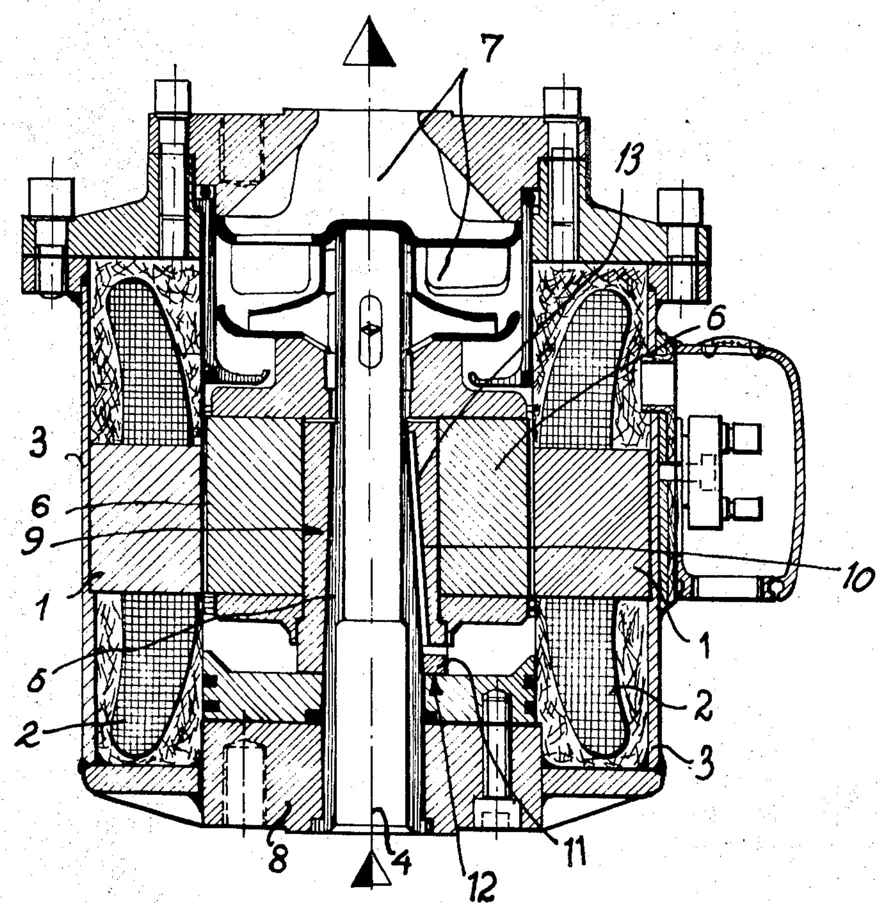
INVENTOR.
J. A. KROSBY
BY Holman, Glascock, Downing & Seebold
ATTORNEYS United States Patent Office 3,537,764

Patented Nov. 3, 1970

3,537,764

BEARING FOR THE ROTOR IN AN ELECTRIC MOTOR

Johannes Anders Krosby, Hauketo, Norway, assignor to Kvaerner Brugs Kjoleavdeling A/S, Sandvika, near Oslo, Norway Filed Feb. 18, 1969, Ser. No. 800,229

Claims priority, application Norway, Feb. 29, 1968, 762

Int. Cl. F16c 25/02

U.S. Cl. 308—70 3 Claims

ABSTRACT OF THE DISCLOSURE

A bearing having conical wearing surfaces which are prevented from being wedged together by means of radially extending wearing surfaces which will be worn in a predetermined proportion to the wear on the conical surfaces.

BACKGROUND OF THE INVENTION

This invention relates to an improvement for a bearing for the rotor in an electric motor which is designed to operate on a vertical axis. Hermetically sealed refrigerating units are a typical example of the application of such motors. In such an assemblage, the motor and the pump are combined to form a unit enclosed in a hermeticlly sealed casing with an inlet and outlet for the coolant. Such a unit has to operate for a number of years without the possibility of maintenance or inspection, and the only factor which limits the life of the unit is the life of the bearings for the armature or the rotor. To build into to motor a reasonable supply of lubricant serves little purpose because this will mix with the coolant and loose its lubricating ability after quite a short time. Wear in the bearing leads to the occurrence of slack with the result that the rotor can move radially and thus strike against the stator thereby rendering the motor unserviceable. Wear is, however, unavoidable, and any form of wear results in a movement of the one worn member relative to the other. This fact has previously been exploited in the rotor bearing for the purpose under discussion in that the shaft and the bearing are both made with conical surfaces which remain in contact with one another also after wear, in that the wear leads to an axial movement of the rotor which brings the conical surfaces into contact with one another at all times. The rotor must thus be built with such axial displacement in view, inter alia, in that the rotor has a somewhat larger axial length than the field magnets of the motor. An example of this will be found in U.S. Pat. No. 3,114,322, but the disadvantage of the known conical bearings is that they require a large amount of space because the angle of the cone must be comparatively large in order to prevent the bearing surfaces from becoming firmly wedged against one another. This is due to the fact that if the angle of the cone is reduced below a certain limit there is the risk that the friction between the bearing surfaces will become unreasonably high.

SUMMARY OF THE INVENTION

The object of the present invention is primarily to obviate this disadvantage by providing an arrangement which makes it possible to have a very mall angle of cone, thereby resulting in slim bearing members which do not require more space than ordinary cylindrical bearings. This is achieved by employing, in addition to the conical bearing, an end bearing which supports the major part of the weight of the rotor. The end bearing can have flat surfaces which slide against one another, while the conical bearings have bearing surfaces in very light contact with one another, but with sufficiently good guidance of the rotor to prevent the rotor from moving radially. The rate of wear of the various bearing surfaces is so adjustable that the end surfaces, as time progresses, wear at such a rate that the surface pressure between the conical bearing members, which also wear, remains approximately constant.

The invention relates to an improvement for the bearing of the rotor in an electric motor operable with a verticle shaft, particularly for the driving of a pump in a hermetically sealed refrigerating system, in which the two members of the bearing have conical sliding surfaces which fit together, whereby the rotor moves axially as the sliding surfaces wear, and the primary characteristic feature is that the sleeve-shaped bearing of the rotor, which is suspended on a stationary shaft, has an end surface resting against an adjacent stationary service, with the area and wearing rate of these surfaces being so chosen that the wearing-down is caused to suit the wearing-down of the conical sliding surfaces in such a way that the frictional forces between the conical surfaces are, at all times, so small that they do not become wedged against one another, but is necertheless such that side slack of the rotor is obviated.

Further features of the invention consist in the shaft being made of metal, the sleeve of carbon, and the sleeve having grooves and channels for the supply of media which can reduce the friction between the conical surfaces.

DETAILED DESCRIPTION OF THE INVENTION

The invention will be explained in more detail in the following with reference to the drawing which shows a motor comprising a stator 1 with windings 2 enclosed in a motor-housing 3 which, at its lower end in the example shown, has an inlet 4 for a coolant through a central stationary hollow shaft 5 on which a rotor 6 of the motor is suspended. The hollow shaft 5 conducts the coolant to a coolant pump, driven by the motor, and the pump is generally denoted 7. The pump and motor are, in the known manner, hermetically sealed and designed to work for many years without inspection or maintenance. The hollow shaft 5 is fixed in an end cover 8 of the motor-housing, and the rotor 6 is suspended for rotation on this shaft. In order to prevent wear from making it possible for the rotor 6 to become slack radially, that is to say horizontally with the result that it strikes against the stator 1 of the rotor, the bearing surfaces between the rotor 6 and the shaft 5 are made conical as indicated at 9. As the bearing surfaces wear, the rotor 6 will move axially downward, and the conical shape of the bearing surfaces will at all times keep the rotor 6 centered in the motor. The conical shape does, however, involve the disadvantage that the rotor 6 can become firmly wedged against the surfaces 9, especially after the motor has been standing still for a time. In order to obviate this possibility, the bearing in the rotor 6, according to the invention, is furthermore made in the form of a sleeve 10, with lower end 11 thereof having a bearing surface which at 12 lies against a bearing surface on a stationary part of the motor. The bearing surface 11 is, with regard to the size and rate of wear according to the invention, so adapted relative to the rate of wear of the conical surfaces 9, that the bearing surface 11 holds the sleeve 10 sufficiently high to prevent the conical surfaces from becoming wedged together. On the other hand, the rate of wear of the surface 11 must be such that the wearing of the surfaces 9 does not lead to side slack of the rotor 6. It is advantageous to make the shaft 5 of metal and the bearing sleeve 10 of carbon, especially in connection with the pumping of coolants, and the sleeve 10 can have grooves and channels 13 which conduct friction-reducing media to the conical bearing surfaces.

It may thus be seen that with correct dimensioning of the conical and flat bearing surfaces, it is possible to produce a bearing with a very great length of wear with the result that the motor and thus the refrigerating unit can remain in operation over very long periods. By making the rotor 6 somewhat longer than the axial length of the stator 1, as indicated at A, the axial displacement of the rotor which occurs through the wear of the bearing will not have any influence on the efficiency of the motor.

The example shown serves merely to illustrate the invention and forms no limitation to the protection given by this patent, in that other embodiments of the invention may well be envisaged, for example the motor could be made with a spring or other resilient device which holds the conical bearing surfaces against one another should the motor also adopt other positions than with the axis of rotation vertical.

Having described my invention, I claim:

1. An improvement to a bearing for a rotor in an electric motor which is designed to operate on a vertical axis, particularly for the operation of a pump in a hermetically sealed refrigerating system, in which the bearing comprises a stationary shaft having a conical sliding surface and an adjacent end surface, a sleeve-shaped bearing having a conical sliding surface and an end surface, the end surface of the sleeve being in contact with the end surface adjacent the shaft and the conical sliding surface of the sleeve-shaped bearing being suspended and capable of moving axially on the conical sliding surface of the shaft as the conical sliding surfaces wear, the area and rate of wear of these surfaces being so selected that the wearing is made to suit the wearing of the conical sliding surfaces so that the frictional forces between the conical surfaces at all time are so small that they do not become wedged together, but at the same time, such that side slack of the rotor is obviated.

2. The improvement as clamied in claim 1, characterized in that the shaft is of metal and the sleeve of carbon.

3. The improvement as claimed in claim 1, characterized in that the sleeve has grooves and channels for the supply of media which can reduce the friction between the conical surfaces.

References Cited

UNITED STATES PATENTS 690,024 12/1901 Keller -------------- 308—70

FRED C. MATTERN, Jr., Primary Examiner

F. SUSKO, Assistant Examiner